Figures 1, 2:
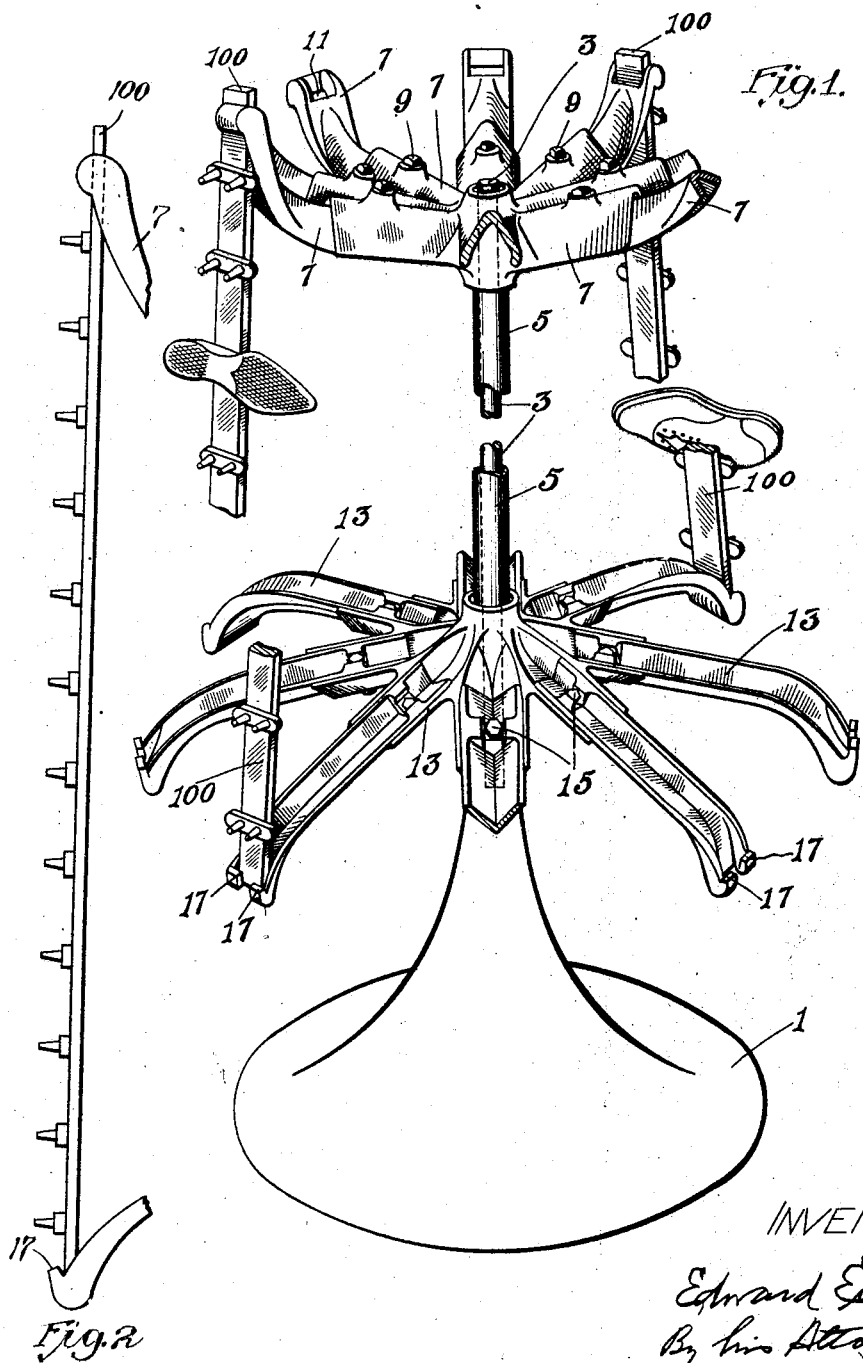

May 11, 1926.

E. ERICKSON

RACK FOR SHOE HOLDERS

Filed June 6, 1923

1,583,784

INVENTOR-
Edward Erickson
By his Attorney,
Nelson W. Howard

Patented May 11, 1926.

1,583,784

UNITED STATES PATENT OFFICE.

EDWARD ERICKSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

RACK FOR SHOE HOLDERS.

Application filed June 6, 1923. Serial No. 643,689.

This invention relates to racks for use in the manufacture of boots and shoes and is herein illustrated as embodied in a rotary rack for use in a rubber shoe factory.

In factories wherein vulcanized rubber footwear is manufactured, shoe holders of a particular type are in common use. These holders are metal bars, usually about five feet in length, rectangular in cross-section, and have projecting from one side thereof a series of pairs of last-pins, the lasts upon which the shoes are made being provided with two last-pin holes to receive a pair of pins. These holders are commonly called "sticks", and their purposes are first to provide means for holding the shoes from touching one another during the making and vulcanizing operations and second to provide means for facilitating the carrying of a plurality of unvulcanized shoes, usually about six on each stick, from one locality to another while still maintaining them in spaced relation. In those factories in which all the making of the shoe, prior to vulcanization, is done by hand, the maker has one or more sticks on his bench upon which he places one by one the partly made shoes and from which he takes them one by one to perform upon them the next operation, this alternate taking of the shoes one by one from the stick or holder and replacing them continuing until the lot of shoes is completely made and ready to be vulcanized. At this stage, the sticks with the shoes on them are picked up and placed in horizontal position on suitable cars which are then wheeled into the vulcanizing oven.

All this is upon the assumption that one operater makes the shoe complete. As a matter of fact, this is seldom the practice. Instead, there are usually teams of operators composed commonly of three operators all working at one bench, two of them making the shoes up to the stage of laying the soles and one of them laying the soles, in which case the sticks may be moved to different localities on the bench prior to placing them upon the car by which they are finally transported to the vulcanizing oven. Whatever system is practised in any particular factory, however, usually involves the use of these sticks.

Of late it has become common practice to dispense with the manual laying of soles and to use instead a sole-laying machine; and, inasmuch as such a machine will lay soles fast enough to absorb the output of a large number of those operators who make the shoe up to the stage of sole-laying, it is necessary to transport to the sole-laying machine the sticks of shoes which are complete except for laying the soles and to hold said sticks in such manner that the sole-laying operator may remove the shoes quickly preparatory to presenting them to the machine.

According to one feature of the present invention, a rack is provided for holding a plurality of these sticks or similar members in a position from which the shoes or other articles carried by them may readily be removed. In the illustrated embodiment of the invention the rack has an upright spindle upon which are revolubly mounted two spiders which are spaced apart a distance less than the length of a stick, the arms of the lower spider having a series of polygonal sockets, and the arms of the upper spider having a series of polygonal holes into which the upper end of a stick which is polygonal in cross-section may be thrust far enough to bring the lower end of the stick above the corresponding socket in the arm of the lower spider. The stick is then permitted to descend until its lower end rests in the socket. Owing to the spacing of the spiders the upper end still extends into the hole in the arm of the upper spider and consequently the stick is securely held. When such a rack, which is located near the sole laying machine, has been filled with sticks of shoes brought to it from the makers' benches, the sole-laying operator may readily remove the shoes from it one by one preparatory to presenting them to the sole laying machine.

This and other features of the invention, including certain details of construction and combinations of parts, will be described as embodied in an illustrative device and pointed out in the appended claims.

Referring now to the accompanying drawing, Fig. 1 shows in perspective a rack in which the present invention is embodied, the middle portion thereof having been broken away to reduce the height of the figure, and Fig. 2 shows in elevation one of the sticks and portions of the upper and lower spiders by which the sticks are held.

Carried by a base or pedestal 1 is an upright spindle 3; and revolubly mounted on the spindle is a sleeve 5. Integral with or fastened to the upper end of the sleeve is a spider 7 the arms of which are each in two parts, fastened together by bolts 9. The outer ends of the arms are turned upwardly and provided with holes 11 which are rectangular in cross-section and large enough to permit the ends of the sticks 100 to be thrust up into them. Fast to or integral with the lower portion of the sleeve 5 is a second spider 13 also having two-part arms fastened together by bolts 15. The outer ends of these arms are downturned and provided with upturned ears or lugs 17 to form sockets which are also rectangular in cross-section. The two spiders have their arms in register vertically; and the operative, stick-engaging portions of one spider are spaced from the similar portions of the other spider a distance less than the length of a stick, the diameter of the upper spider being less than that of the lower.

The rack is placed near the sole-laying machine in such position that it is within easy reach of the sole-laying machine operator. The sticks of shoes, with the soles located properly thereon but not laid or pressed into place, are put on the rack by thrusting the upper end of each stick through the hole in one of the arms of the upper spider until its lower end is above the level of the socket in the corresponding arm of the lower spider, and then allowing the stick to descend until it reaches the position shown in the drawings wherein it is securely held in an inclined position. The sole-laying machine operator removes the shoes one by one and presents them to the machine, turning the sleeve 5 and spiders from time to time as may be desirable.

It will be noted that the sticks are held in the rack from angular movement so that there is no possibility for the sticks to swing about their axes and thus permit contact of shoes upon one stick with shoes upon another, and that the sticks are also held firmly in the rack against the pull exerted by the operator when he removes a shoe.

Having thus described my invention, what I claim as new and desire to secure by Letters Patent of the United States is:—

1. A rack for a plurality of sticks each having detachably mounted upon one side thereof a plurality of shoes adapted to be removed by a pull exerted in a direction transverse to the axis of the stick, said rack comprising a base, and upper and lower members mounted thereon for rotation in unison, said members being formed with a series of complementary stick-engaging openings shaped to permit the sticks to be placed in and removed from the rack at will and constructed and arranged, when the sticks are in the rack, to hold the sticks from angular movement about their axes and to maintain the sticks in place while the shoes are being pulled from them.

2. A rack for sticks of shoes, each stick being polygonal in cross-section and provided on one side with means for detachably holding a plurality of shoes in spaced relation, said rack comprising two members revoluble in unison about a common axis and spaced one above the other a distance less than the length of the sticks, the upper member having a series of polygonal holes into which the upper ends of the sticks may be thrust far enough to bring their lower ends above the level of the lower member, and the lower member having a corresponding series of polygonal sockets to receive the lower ends of the sticks when said sticks are lowered, whereby the sticks are prevented from turning on their axes and are so held that the shoes are presented in spaced relation and may be removed from the sticks while the sticks are in the rack.

In testimony whereof I have signed my name to this specification.

EDWARD ERICKSON.